United States Patent [19]

Garnier

[11] 4,144,955
[45] Mar. 20, 1979

[54] MULTIPLE DISC TORQUE TRANSMISSION DEVICE IN OIL

[75] Inventor: Michel C. Garnier, Brunoy, France

[73] Assignee: Etudes et Recherches Avancees, Saint Etienne, France

[21] Appl. No.: 849,470

[22] Filed: Nov. 7, 1977

[30] Foreign Application Priority Data

Nov. 16, 1976 [FR] France .................... 76 34451

[51] Int. Cl.² .................... F16D 25/063; F16D 13/72
[52] U.S. Cl. .................... 192/52; 192/85 AA; 192/109 F; 192/113 B; 188/72.4; 188/264 E; 192/70.28
[58] Field of Search ............... 192/52, 85 AA, 109 F, 192/70.21; 188/72.4, 72.5

[56] References Cited

U.S. PATENT DOCUMENTS

| | | | |
|---|---|---|---|
| 1,953,187 | 4/1934 | Nakashian | 192/52 |
| 2,385,517 | 9/1945 | Hunt | 192/70.21 |
| 3,384,214 | 5/1968 | Wilson | 192/109 F |
| 3,612,237 | 10/1971 | Honda | 192/109 F |

FOREIGN PATENT DOCUMENTS 1031063  5/1958  Fed. Rep. of Germany ..... 192/85 AA

Primary Examiner—Benjamin W. Wyche
Attorney, Agent, or Firm—Oblon, Fisher, Spivak, McClelland & Maier

[57] ABSTRACT

In this device, two stacks of discs form at least two sub-assemblies separated by an axially movable intermediate pressure disc, the first of these sub-assemblies being located between the intermediate pressure disc and a stop integral with one of the bodies, whereas the second is located between the intermediate pressure disc and an end pressure disc also axially movable, the control means exerting their action in the direction of the stop, first of all on the two pressure discs so as to cancel out the clearances between the discs of the first sub-assembly, then on the end pressure disc so as to cancel out the clearances between the discs of the second sub-assembly and finally on the whole of the discs of both sub-assemblies so as to compress them.

7 Claims, 9 Drawing Figures

Fig. 2
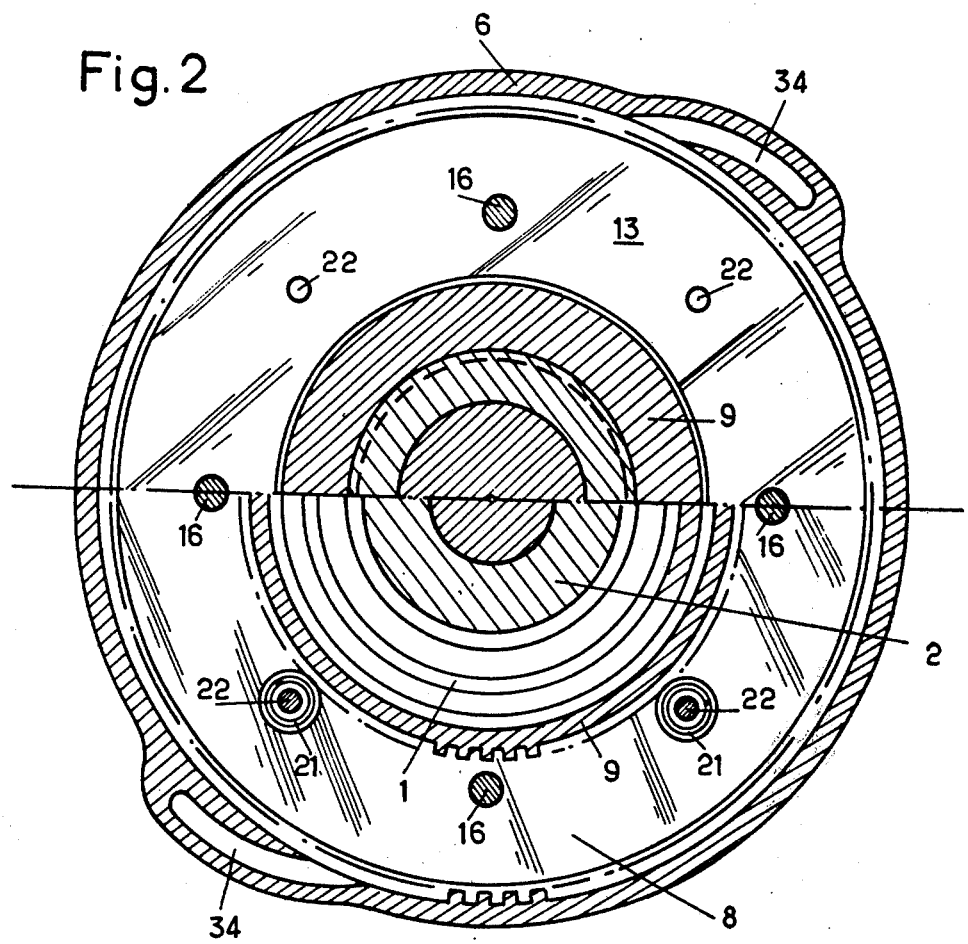
Fig. 8
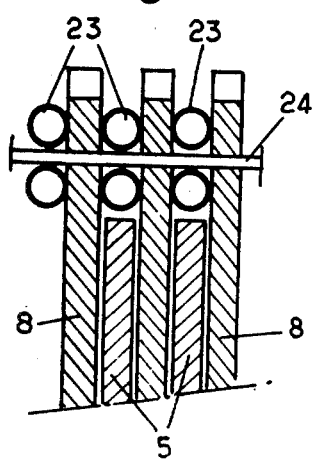
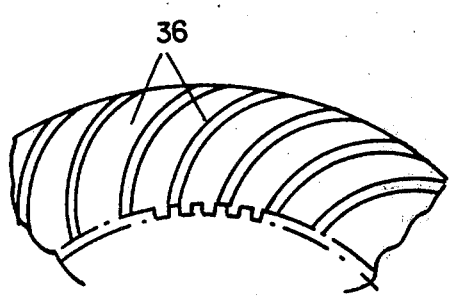
Fig. 9

MULTIPLE DISC TORQUE TRANSMISSION DEVICE IN OIL

BACKGROUND OF THE INVENTION

The present invention relates to multi-disc torque transmission device in oil, of the type comprising a first stack of discs rigidly locked in rotation with a first body and a second stack of discs rigidly locked in rotation with a second body, the discs of the first stack being inserted between the discs of the second and at least one of the two bodies being free to rotate in relation to the other, and control means for axially moving the discs of the two stacks so as to compress them against each other.

In these transmission devices, whether for brakes or clutches, the thrust force necessary for the compression of the discs increases in proportion as these latter come into contact and it frequently happens that the action exerted on the discs the most distant from the control means is insufficient.

SUMMARY OF THE INVENTION

The present invention proposes remedying this disadvantage and, to do this, it has as its object a torque transmission device which is characterized in that the two stacks of discs form at least two sub-assemblies, separated by an axially movable intermediate pressure disc, the first of these sub-assemblies being situated between the intermediate pressure disc and a stop integral with one of the two bodies, whereas the second is situated between the intermediate pressure disc and an end pressure disc also axially movable, the control means exerting their action in the direction of the stop, at first on the two pressure discs so as to cancel out the clearances between the discs of the second sub-assembly and finally on the whole of the discs of both sub-assemblies so as to compress them.

With these arrangements, the discs of both stacks are now brought into contact before being compressed. It will be readily understood that, at the moment of their compression, the thrust force is uniformly exerted on each of them, which improves the efficiency of the device.

Preferably, the present invention relates to a multiple disc brake in which the pressure discs are axially movable on the body carrying the stop, which body is provided fixed inside the other body which is free to rotate. According to a particular embodiment of this brake, the control means are formed by concentric pistons parallel to the axis of the pressure discs and evenly spread out in a circular member integral with the fixed body, which member is situated behind the end pressure disc, these concentric pistons each comprising a central piston whose body bears against the end pressure disc and presents a smaller section axial extension bearing against the intermediate pressure disc after passing through the end pressure disc and the fixed discs of the second sub-assembly, an intermediate annular piston surrounding the body of the central piston and bearing at the rear against a shoulder thereof, and an outer annular piston in its turn surrounding the intermediate piston, these pistons being actuatable by a pressurized fluid controlling first of all the simultaneous movement of the central piston and of the intermediate piston, then that of the intermediate piston alone and finally that of the end piston.

It is to be noted that the central and intermediate pistons have small diameters, which allows rapid contacting of the discs of the first and then of the second sub-assembly.

In currently known disc brakes, the freeing of the discs when the control means are disconnected generally takes place slowly and irregularly.

The present invention proposes remedying this other disadvantage and, to this end, the disc brake to which it relates is characterized moreover in that the control means exert their action in the direction of the stop against that exerted by two series of return springs fitted over parallel rods passing through the assembly of fixed discs and extending between the stop and the end pressure disc, the return springs of one series bearing against the stop and the corresponding face of the intermediate pressure disc, whereas those of the other series, which are less rigid, bear against the opposing faces of the pressure discs.

With this other arrangement, the intermediate and end pressure discs can return to their initial position as soon as the control means are disconnected. The separation of the discs can then take place more rapidly.

According to a variation, the control means are formed by a ring bearing against the end pressure disc, this ring being housed in a circular furrow formed in a part integral with the fixed body, which part is located behind the end pressure disc; parallel rods passing through the assembly of fixed discs and extending between the end pressure disc and the stop, in relation to which they are axially movable, these rods having a larger section at their part located inside the pressure discs; washers fitted over the rods and applied against the faces of the pressure discs; two series of springs surrounding the rods, the springs of the first series bearing against the stop of the fixed body and the washer applied to the corresponding face of the intermediate pressure disc, whereas those of the second series, which are more rigid, bear against the washers applied to the opposing faces of the two pressure discs, the bottom of the circular furrow being connectable to a pressurized fluid source for moving the ring against the action exerted by the springs.

When the ring is pushed by the pressurized fluid, it in its turn pushes the end pressure disc and the washers applied thereagainst. Now, since the springs of the second series are more rigid than the others, they are not immediately compressed but control the movement of the intermediate pressure disc, which allows the bringing into contact of the discs of the first sub-assembly.

Then, when this first approach phase is achieved, the end pressure disc moves in its turn during the compression of the springs of the second series, which allows the discs of the second sub-assembly to be brought into contact.

Of course, the compression of the assembly of discs takes place immediately after the completion of this second approach phase.

It is to be noted that the different springs also contribute to the separation of the discs during releasing.

According to another characteristic of the invention, the disc brake of the invention comprises furthermore small bars bearing, at their ends, on the stop and on the end pressure disc, these small bars passing through fixed discs and carrying therebetween resilient rings whose thickness is slightly greater than that of the movable discs.

It can readily be understood that, on release of the discs, these resilient rings provide uniform distribution of the clearances necessary between each disc.

Advantageously, the two disc sub-assemblies are disposed in an oil circuit comprising small troughs formed in the inner wall of the movable body and emerging slightly behind a deflector fixed on the face of the stop which is opposed to the discs, this deflector serving to direct the oil which the troughs take from the space enclosing the discs, to curved passage-ways formed in said face of the stop, then towards an annular channel defined by the fixed body and a cylindrical part integral with the moving body, which part extends under the fixed body and carries at this location sloping helical grooves so as to promote the advance of the oil in the channel, as well as in bores formed in the fixed body to bring the oil back to the space enclosing the discs.

During rotation of the mobile body, oil circulation can thus be set up between the different discs, which protects the brake from untimely wear.

BRIEF DESCRIPTION OF THE DRAWINGS

Two embodiments of the present invention are shown by way of example in the accompanying drawings in which:

FIG. 2 is a sectional view along line II—II of FIG. 1;

FIG. 8 is a partial sectional view showing resilient rings for distributing the clearances among the discs; and FIG. 9 is a partial schematical view illustrating the passage-ways formed on the stop.

DETAILED DESCRIPTION OF THE PREFERRED EMBODIMENTS

Figure 1:
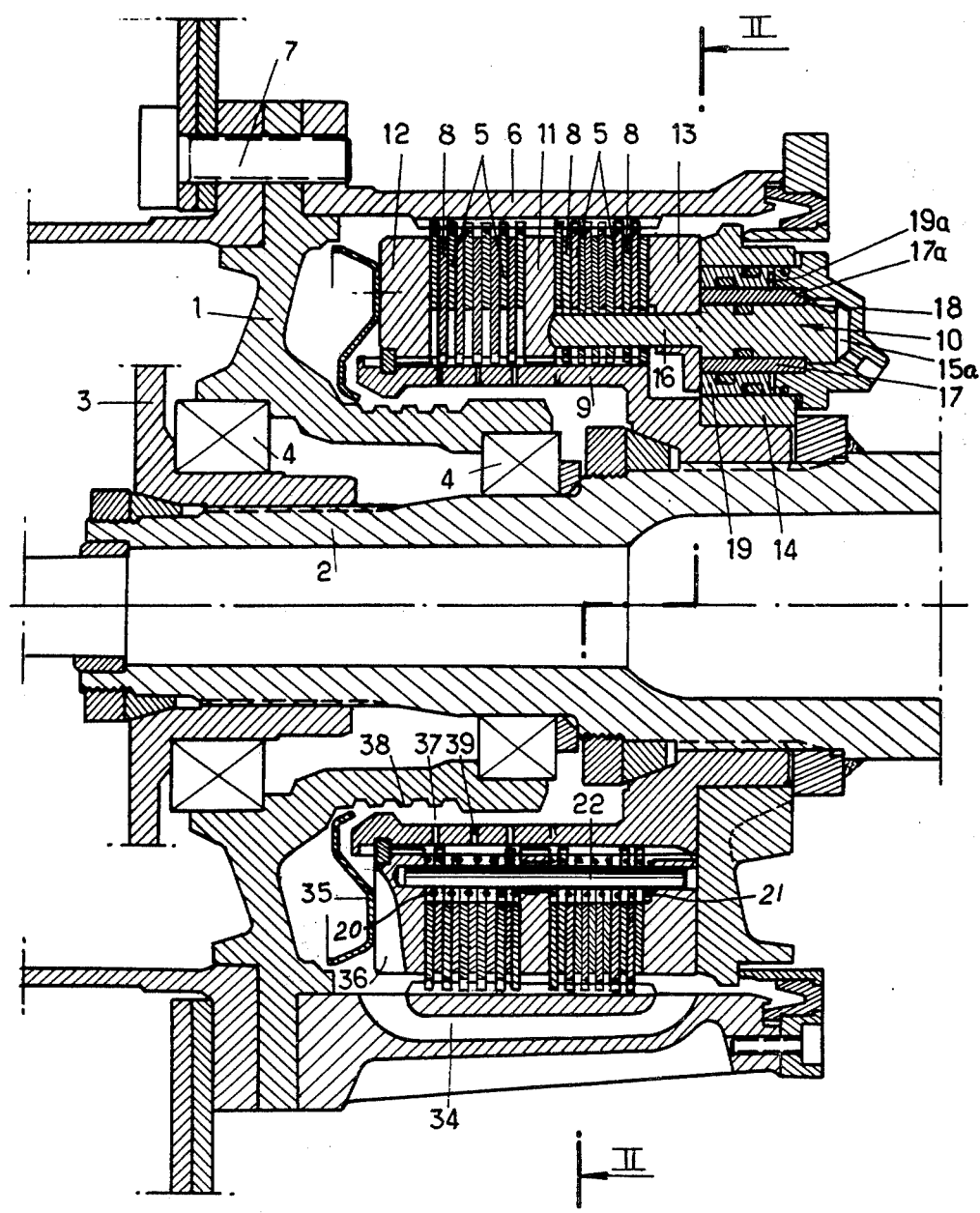
FIG. 1 is an axial sectional view of a multiple-disc brake of the invention.
Figure 3:
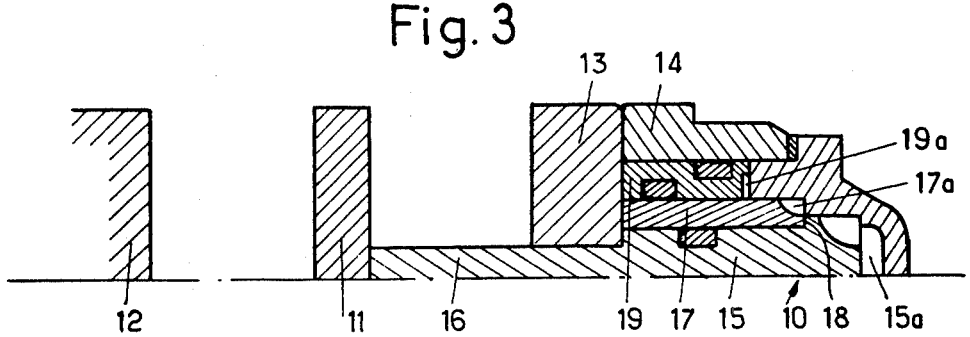
FIGS. 3 to 6 are partial schematical sections showing the operation of the control means provided for moving the discs of the brake shown in FIGS. 1 and 2.

The disc brake shown in FIGS. 1 and 2 is mounted, as is known per se, on a wheel-hub 1 rotatable on a banjo 2 and a crown wheel support 3 forming part of a non-illustrated differential, by means of bearings 4.

In a conventional way, this brake comprises a first stack of discs 5 locked in rotation with a drum 6 fixed at 7 on the hub, a second stack of discs 8 inserted between discs 5 and locked in rotation with a body 9 jammed on the banjo, and control means 10 for axially moving the discs of both stacks so as to compress them against each other.

In accordance with the invention, the two stacks of discs form two sub-assemblies separated by an intermediate pressure disc 11 locked in rotation with body 9. The first of these sub-assemblies is located between pressure disc 11 and a stop 12 fixed on body 9, whereas the second is located between the disc 11 and a pressure disc 13 also locked in rotation with body 9.

Turning to the control means 10, they are formed by concentric pistons parallel to the axis of the disc assembly and evenly distributed in a member 14 fixed on body 9, behind the end pressure disc 13.

As can be best seen in FIG. 1, the concentric pistons comprise each a central piston 15 whose body bears against pressure disc 13 and has an axial extension 16 of smaller section bearing against pressure disc 11 after passing through pressure disc 13 and discs 8, an intermediate annular piston 17 surrounding the body of the central piston and bearing, at the rear, against a shoulder 18 thereof, and an outer annular piston 19 surrounding in its turn the intermediate piston 17.

These concentric pistons define chambers, respectively, 15a, 17a and 19a, connectable one after the other to a pressurized fluid source and can then be successively advanced in the direction of stop 12.

According to a particular feature of the invention, the pistons move against the action exerted by two series of springs 20,21. These are fitted on parallel rods 22 passing through pressure disc 11 and the assembly of discs 8 to come and bear, with their ends, on stop 12 and pressure disc 13. In the example shown, springs 20 bear against the stop and the corresponding face of pressure disc 13, whereas springs 21, which are less rigid, bear against the opposing faces of both pressure discs 11 and 13.

The operation of the brake illustrated in FIGS. 1 and 2 will be described hereafter with reference to FIGS. 3 to 6, assuming that, at the outset, (FIG. 3) discs 5 and 8 are separated from each other by suitable residual clearances.

When chamber 15a is connected to the pressurized fluid source, piston 15 moves towards stop 12 taking with it intermediate pressure disc 11 and piston 17 which, in its turn, drives the outer pressure disc 13.

Figure 4:
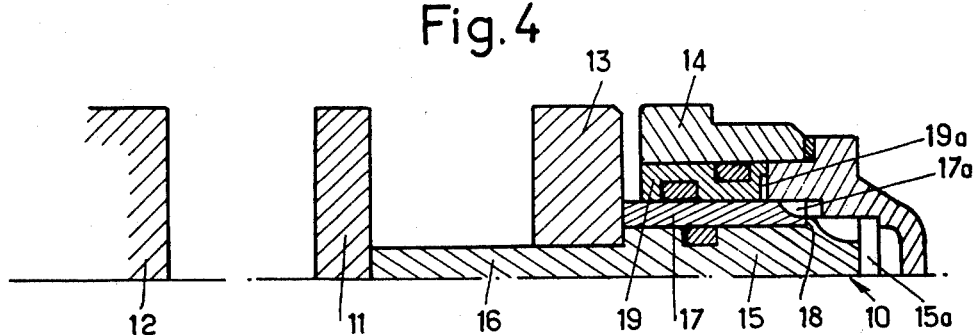
Figure 5:
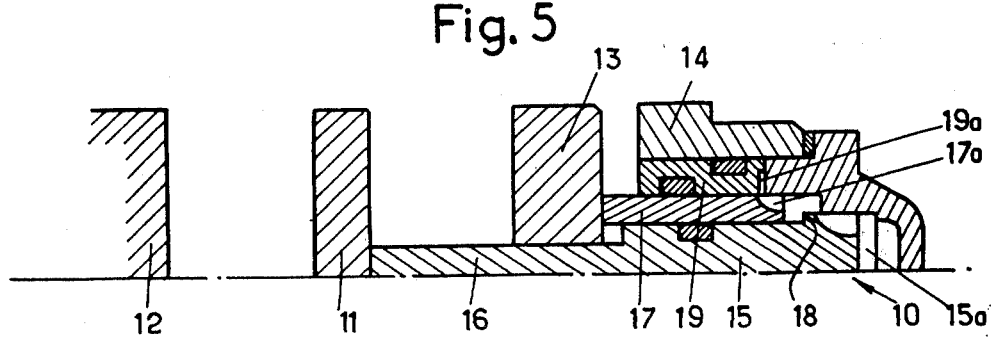

Since the distance between both pressure discs is constant, discs 5 and 8, located therebetween, move axially so that the sum of the clearances provided therebetween keep the same value. On the contrary, the distance separating stop 12 from pressure disc 11 diminishes. Now, meantime, discs 5 and 8, located between these two members, come closer and closer together and come into contact when piston 15 allows the connection between chambers 15a and 17a, as shown in FIG. 4.

From this moment, piston 17 moves alone and pushes pressure disc 13 towards pressure disc 11. Discs 5 and 8, located between the pressure discs, then come closer together and come finally into contact when piston 17 occupies the position shown in FIG. 5, the connection between chamber 17a and 19a being in its turn achieved in this position.

Figure 6:
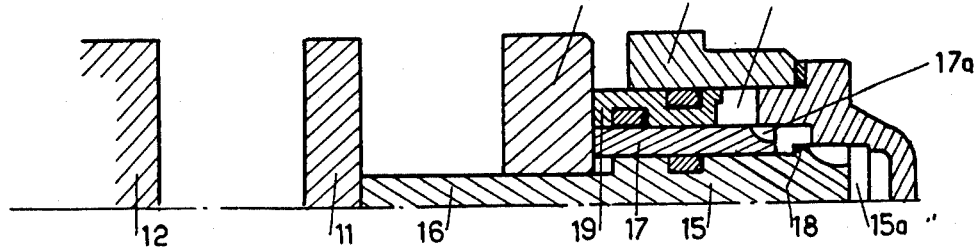

Thereafter piston 19 is pushed against pressure disc 13, as shown in FIG. 6, which allows it to exert the final compression of the assembly of discs 5 and 8.

Thus, the final compression takes place after two successive approach phases in which the discs, taking into account the small diameters of pistons 15 and 17, are brought rapidly into contact and under the action of a limited pressure. It can then be easily understood that the pressure is uniformly exerted on all the discs, whatever the distance separating the pistons.

If now the supply is cut off to the pistons, springs 20, which are more rapid, are the first to exert their action and cause the recoil of pressure disc 11 which, in its turn, pushes back all the mobile members behind it. Discs 5 and 8, located between stop 12 and pressure disc 11, can thus return to their initial position with the same residual clearances.

Since springs 21 can now exert their action, they push back disc 13, which allows discs 5 and 8, which are still pressed against both pressure discs, to come back, in their turn, to their initial position.

It should be noted that, after release of discs 5 and 8, the residual clearances may be evenly spread out, owing to the resilient rings 23, such as those shown in FIG. 8. These rings, which are fitted on small bars 24 passing through discs 8 and bearing, at their ends, on stop 12 and pressure disc 13, are formed of elastomer and are centered on the bars 24 and have in fact a thickness such that during their decompression, the clearances between discs 5 and 8 become substantially constant.

Figure 7:
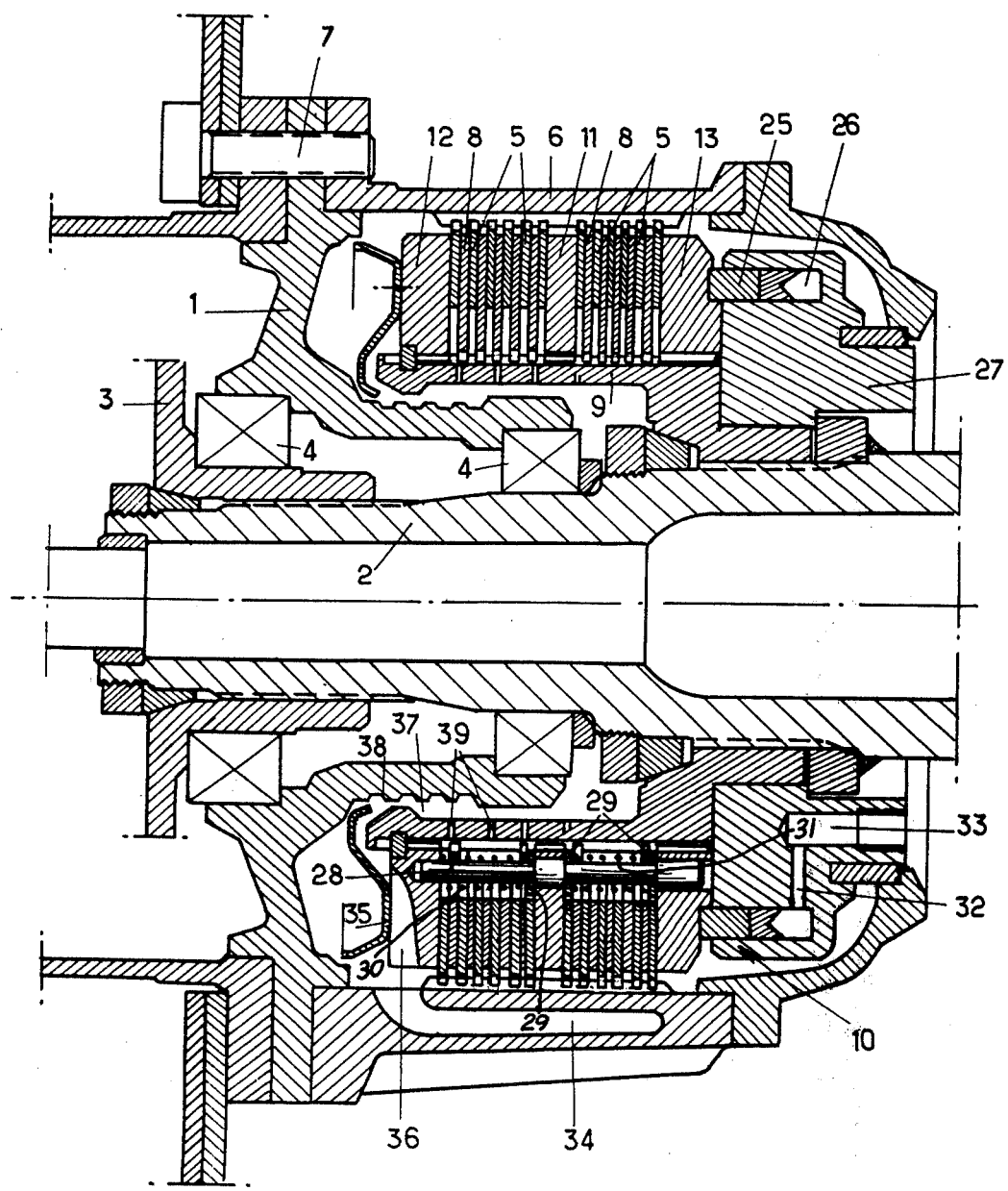
FIG. 7 is an axial sectional view of a disc brake according to another embodiment.

The disc brake shown in FIG. 7 differs from that shown in FIGS. 1 and 2 only by its control means 10.

These are in fact formed here by a ring 25 bearing against pressure disc 13 and which is housed in a circular furrow 26 formed in a member 27 internal with body 9; parallel rods 28 evenly spread out around body 9 passing through discs 8 to bear on stop 12 and pressure disc 13, and having a larger section at their part located inside the pressure discs; washers 29 fitted on rods 28 and applied against the faces of the pressure discs; and two series of springs 30 and 31 surrounding the rods, springs 30 bearing on stop 12 and the washers facing this latter, whereas springs 31, which are more rigid, bear against the washers resting on the opposite faces of both pressure discs.

So that ring 25 may move in the direction of stop 12, the bottom of the furrow 26 is connectable through passage-ways 32 and 33 to a source of pressurized fluid.

When the pressurized fluid is fed to furrow 26, it pushes ring 25 which, in its turn, pushes pressure disc 13 and the washers applied thereagainst. Springs 31, which are more rigid than springs 30, are not immediately compressed, so that the washers facing the previous ones move in the direction of the stop taking with them rods 28 and pressure disc 11. This latter then compresses springs 30, thus allowing discs 5 and 8 located in front of it to be brought into contact.

Then, while the ring continues to move, springs 31 are compressed in their turn, which allows pressure disc 13 to come near to pressure disc 11 and discs 5 and 8 located therebetween also to be brought into contact. When this phase is completed, the ring finally exerts its action on the assembly of discs 5 and 8 for the final compression.

Conversely, when the connection between furrow 26 and the pressurized fluid source is interrupted, springs 31 relax before springs 30, which allows discs 5 and 8, located between compression discs 11 and 13, to come back to their initial position before the others.

It is evident that, after release of discs 5 and 8, the residual clearances can be spread out uniformly by means of resilient rings, such as those described above with reference to FIG. 8.

It will be noted moreover that, in both embodiments considered here, discs 5 and 8 are disposed in an oil circuit comprising troughs 34 formed in the inner wall of drum 6 and emerging slightly behind a deflector 35 fixed on the front face of stop 12. The deflector serves to direct the oil, taken by the troughs in the space enclosing discs 5 and 8, towards curved passage-ways 36 in said front face of the stop (see FIG. 9), the clockwise rotation (as seen in FIG. 9) of which causes the oil to be "scooped up" by the curved passage-ways towards an annular channel 37 towards an annular channel 37 defined by body 9 and hub 1. This latter is provided with helical grooves 38 promoting the advance of the oil in the channel by directing towards bores 39 which are formed in body 9 to bring back the oil from the channel into the space enclosing discs 5 and 8 with the aid of centrifugal force.

During rotation of drum 6, discs 5 and 8 are then constantly bathed in an oil flow, which allows the brake to operate in the best conditions.

What is claimed as new and desired to be secured by Letters Patent is:

1. A multiple-disc torque transmission device in oil, of the type comprising a first stack of discs locked in rotation with a first body, a second stack of discs locked in rotation with a second body, the discs of the first stack being inserted between the discs of the second and at least one of the two bodies being free to rotate in relation to the other, and control means for axially moving the discs of both stacks so as to compress them against each other, characterized in that the two stacks of discs form at least two sub-assemblies separated by an axially movable intermediate pressure disc, the first of these sub-assemblies being located between the intermediate pressure disc and a stop integral with one of the two bodies, whereas the second is located between the intermediate pressure disc and an end pressure disc also axially movable, the control means exerting their action in the direction of the stop, at first on the two pressure discs so as to cancel out the clearances between the discs of the first sub-assembly, then on the end pressure disc so as to cancel out the clearances between the discs of the second sub-assembly, and finally on the whole of the discs of both assemblies so as to compress them.

2. A device according to claim 1, characterized in that the pressure discs are axially movable on the body carrying the stop, which body is provided fixed inside the other body which is free to rotate.

3. A device according to claim 2, characterized in that the control means are formed by concentric pistons parallel to the axis of the pressure discs and evenly spread out in a circular member integral with the fixed body, which member is located behind the end pressure disc, these concentric pistons each comprising a central piston whose body bears against the end pressure disc and has a smaller section axial extension bearing against the intermediate pressure disc after passing through the end pressure disc and the fixed discs of the second sub-assembly, an intermediate annular piston surrounding the body of the central piston and bearing, at the rear, against a shoulder thereof, and an outer annular piston surrounding in its turn the intermediate piston, these pistons actuated by a pressurized fluid controlling first of all the simultaneous movement of the central piston and the intermediate piston, then that of the intermediate piston alone and finally that of the end piston.

4. A device according to claim 2, characterized in that the control means exert their action in the direction of the stop against that exerted by two series of return springs fitted on parallel rods passing through the assembly of fixed discs and extending between the stop and the end pressure disc, the return springs of one series bearing against the stop and the corresponding face of the intermediate pressure disc, whereas those of the other series, which are less rigid, bear against the opposite faces of the pressure discs.

5. A device according to claim 2, characterized in that the control means are formed by a ring bearing against the end pressure disc, this ring being housed in a circular furrow formed in a member integral with the fixed body, which member is located behind the end pressure disc; parallel rods passing through the assembly of fixed discs and extending between the end pressure disc and the stop in relation to which they are axially movable, these rods having a larger section at their part located inside the pressure discs; washers fitted on the rods and applied against the faces of the pressure discs; and two series of springs surrounding the rods, the springs of the first series bearing against the stop of the fixed body and the washer applied to the corresponding face of the intermediate pressure disc, whereas those of the second series, which are more rigid, bear against the washers applied to the opposite faces of both pressure discs, the bottom of the circular furrow being connectable to a source of pressurized fluid for moving the ring against the action exerted by the spring.

6. A device according to claim 5, characterized in that it comprises furthermore small bars bearing, at their ends, on the stop and on the end pressure disc, these small bars passing through the fixed discs and carrying therebetween resilient rings whose thickness is slightly greater than that of the mobile discs.

7. A device according to claim 6, characterized in that the two sub-assemblies of discs are disposed in an oil circuit comprising troughs formed in the inner wall of the mobile body and emerging slightly to the rear of a deflector fixed on the face of the stop which is opposite the discs, this deflector being intended to direct the oil, which is taken by the troughs from the space enclosing the discs, towards curved passage-ways fromed in said face of the stop, then towards an annular channel defined by the fixed body and a cylindrical member integral with the mobile body, which member extends under the fixed body and carries at this location sloping helical grooves for promoting the advance of the oil in the channel, as well as in bores formed in the fixed body to bring the oil back to the space enclosing the discs.

* * * * *